US011991641B2

United States Patent
Xue et al.

(10) Patent No.: US 11,991,641 B2
(45) Date of Patent: May 21, 2024

(54) NETWORK-CONTROLLED POWER CONTROL ON SIDE-LINK COMMUNICATIONS

(71) Applicant: QUALCOMM Incorporated, San Diego, CA (US)

(72) Inventors: Yisheng Xue, San Diego, CA (US); Piyush Gupta, Bridgewater, NJ (US); Xiaoxia Zhang, San Diego, CA (US); Jing Sun, San Diego, CA (US); Seyed Ali Akbar Fakoorian, San Diego, CA (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 16/996,751

(22) Filed: Aug. 18, 2020

(65) Prior Publication Data

US 2021/0076331 A1 Mar. 11, 2021

Related U.S. Application Data

(60) Provisional application No. 62/897,791, filed on Sep. 9, 2019.

(51) Int. Cl.
*H04W 52/14* (2009.01)
*H04L 1/1607* (2023.01)
(Continued)

(52) U.S. Cl.
CPC ......... *H04W 52/146* (2013.01); *H04L 1/1692* (2013.01); *H04L 1/1854* (2013.01);
(Continued)

(58) Field of Classification Search
CPC ... H04L 1/1692; H04L 1/1854; H04L 5/0055; H04L 1/1812; H04L 5/0048;
(Continued)

(56) References Cited

U.S. PATENT DOCUMENTS 11,102,631 B2 * 8/2021 Zhang .................. H04W 4/44
2002/0145991 A1 * 10/2002 Miya .................... H04L 1/1809
370/337

(Continued)

FOREIGN PATENT DOCUMENTS

EP           2945438 A1    11/2015
WO    WO-2020062044 A1 *  4/2020
(Continued)

OTHER PUBLICATIONS

International Search Report and Written Opinion—PCT/US2020/047027—ISA/EPO—dated Nov. 26, 2020.

*Primary Examiner* — Steven Hieu D Nguyen
(74) *Attorney, Agent, or Firm* — QUALCOMM Incorporated

(57) ABSTRACT

Network-controlled power control for side-link communications is disclosed. According to the described aspects, a power control framework is defined for network-controlled side-band or device-to-device (D2D) communications, in which transmission power for side-link communications may be stepped up enough for a base station in a connected mode with at least one of multiple user equipment (UE) devices to detect side-link communications between the UEs in order to take responsive action to enhance the reliability of the communications. The base station provides the configuration information to the UEs which may be used when preparing for transmissions of side-link traffic and/or feedback.

28 Claims, 8 Drawing Sheets

(51) Int. Cl.
*H04L 1/1829* (2023.01)
*H04L 5/00* (2006.01)
*H04W 52/48* (2009.01)
*H04W 72/21* (2023.01)

(52) U.S. Cl.
CPC ............ *H04L 5/0055* (2013.01); *H04W 52/48* (2013.01); *H04W 72/21* (2023.01)

(58) Field of Classification Search
CPC .. H04L 1/1819; H04L 1/1896; H04W 52/146; H04W 52/48; H04W 72/0413; H04W 52/362; H04W 52/367; H04W 52/383; H04W 52/50; H04W 92/18; H04W 4/40; H04W 76/14; H04W 72/0473
See application file for complete search history.

(56) References Cited

U.S. PATENT DOCUMENTS

| | | | | |
|---|---|---|---|---|
| 2003/0031203 A1* | 2/2003 | Fukui | ................ | H04L 1/1887 370/469 |
| 2007/0173278 A1* | 7/2007 | Yoon | ................ | H04W 52/247 455/522 |
| 2008/0081651 A1* | 4/2008 | Kuroda | ................ | H04L 1/1893 455/509 |
| 2010/0029322 A1* | 2/2010 | Englund | ............. | H04W 52/362 455/522 |
| 2010/0048236 A1* | 2/2010 | Higuchi | .............. | H04W 52/146 455/522 |
| 2014/0010209 A1* | 1/2014 | Hakola | ................ | H04W 76/14 370/336 |
| 2014/0119306 A1* | 5/2014 | Yang | .................... | H04L 1/1819 370/329 |
| 2015/0139111 A1* | 5/2015 | Fodor | ................ | H04W 52/383 370/329 |
| 2015/0334715 A1* | 11/2015 | Chang | ................... | H04W 4/70 370/329 |
| 2016/0037322 A1* | 2/2016 | Nguyen | ................ | H04W 8/005 370/329 |
| 2016/0173239 A1* | 6/2016 | Kim | ....................... | H04L 1/1812 370/329 |
| 2018/0035278 A1* | 2/2018 | Aminaka | ................ | H04W 8/00 |
| 2018/0146494 A1* | 5/2018 | Khoryaev | ............. | H04W 76/23 |
| 2019/0052436 A1* | 2/2019 | Desai | ..................... | H04L 5/0055 |
| 2019/0052439 A1* | 2/2019 | Seo | ........................ | H04L 1/1887 |
| 2019/0116582 A1* | 4/2019 | Pelletier | ............. | H04W 72/042 |
| 2019/0124634 A1* | 4/2019 | Li | ...................... | H04W 72/0446 |
| 2019/0174429 A1* | 6/2019 | Wang | ...................... | H04W 4/70 |
| 2020/0008127 A1* | 1/2020 | Ohtsuji | ................ | H04W 40/22 |
| 2020/0022089 A1* | 1/2020 | Guo | ........................ | H04W 24/08 |
| 2020/0029318 A1* | 1/2020 | Guo | ........................ | H04L 1/1822 |
| 2020/0092692 A1* | 3/2020 | Wang | ...................... | H04W 4/40 |
| 2020/0100215 A1* | 3/2020 | Li | ......................... | H04L 1/1887 |
| 2020/0145799 A1* | 5/2020 | Baghel | ................. | H04L 1/0026 |
| 2020/0154372 A1* | 5/2020 | Chae | .................... | H04W 52/383 |
| 2020/0163028 A1* | 5/2020 | Chae | .................... | H04W 52/38 |
| 2020/0163103 A1* | 5/2020 | Kuang | .................. | H04W 76/30 |
| 2020/0228247 A1* | 7/2020 | Guo | ..................... | H04W 52/383 |
| 2020/0252167 A1* | 8/2020 | Kwak | .................. | H04L 1/1812 |
| 2020/0344722 A1* | 10/2020 | He | ....................... | H04L 1/1819 |
| 2020/0367250 A1* | 11/2020 | Tang | .................. | H04W 72/0473 |
| 2021/0037476 A1* | 2/2021 | Ryu | ..................... | H04W 52/383 |
| 2021/0045061 A1* | 2/2021 | Akkarakaran | ........ | H04L 5/0048 |
| 2021/0045066 A1* | 2/2021 | Akkarakaran | ........ | H04W 52/54 |
| 2021/0282143 A1* | 9/2021 | Lee | .................... | H04W 52/281 |
| 2021/0344454 A1* | 11/2021 | Lee | ..................... | H04L 1/1896 |
| 2021/0360520 A1* | 11/2021 | Chen | ................... | H04L 1/1822 |
| 2021/0377871 A1* | 12/2021 | Zhao | ................... | H04W 52/12 |
| 2021/0410084 A1* | 12/2021 | Li | ....................... | H04W 52/265 |
| 2022/0007403 A1* | 1/2022 | Li | ......................... | H04W 72/20 |

FOREIGN PATENT DOCUMENTS

| | | | | |
|---|---|---|---|---|
| WO | WO-2020063857 A1 * | 4/2020 | ........... | H04L 1/1822 |
| WO | WO-2020164071 A1 * | 8/2020 | ........... | H04W 24/00 |

* cited by examiner

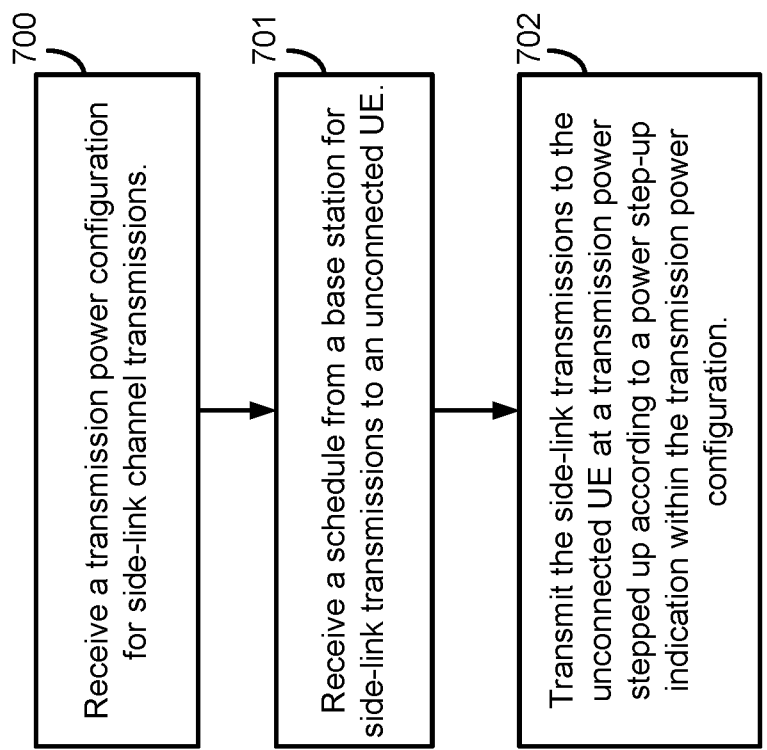

NETWORK-CONTROLLED POWER CONTROL ON SIDE-LINK COMMUNICATIONS

CROSS-REFERENCE TO RELATED APPLICATIONS

This application claims the benefit of U.S. Provisional Patent Application No. 62/897,791, entitled, "NETWORK-CONTROLLED POWER CONTROL ON SIDE-LINK COMMUNICATIONS," filed on Sep. 9, 2019, which is expressly incorporated by reference herein in its entirety.

BACKGROUND

Field

Aspects of the present disclosure relate generally to wireless communication systems, and more particularly, to network-controlled power control on side-link communications.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a user equipment (UE), a transmission power configuration for side-link channel transmissions, wherein the UE is connected to a connected UE via a side-link channel, receiving, at the UE, side-link transmissions from the connected UE via the side-link channel, determining, by the UE, an acknowledgement status of the side-link transmissions, and transmitting, by the UE, the acknowledgement status to the connected UE via the side-link channel at a transmission power stepped up according to a power step-up indication within the transmission power configuration.

In an additional aspect of the disclosure, a method of wireless communication includes receiving, at a UE from a base station in a connected state with the UE, a transmission power configuration for side-link channel transmissions, wherein the UE is connected to an unconnected UE via a side-link channel, receiving, by the UE, a schedule for side-link transmissions to the unconnected UE, and transmitting, by the UE, the side-link transmissions to the unconnected UE at a transmission power stepped up according to a power step-up indication within the transmission power configuration.

In an additional aspect of the disclosure, a method of wireless communication includes signaling, by a base station, a side-link power configuration identifying a power step-up indication for transmissions via a side-link channel, detecting, by the base station, an acknowledgement status transmitted by an unconnected UE via the side-link channel, wherein the acknowledgement status is in response to side-link transmissions between a connected UE, in a connected state with the base station, and the unconnected UE, in an unconnected state with the base station, and enabling, by the base station, a retransmission of the side-link transmissions in response to the acknowledgement status being a negative acknowledgement (NACK).

In an additional aspect of the disclosure, an apparatus configured for wireless communication includes means for receiving, at a UE, a transmission power configuration for side-link channel transmissions, wherein the UE is connected to a connected UE via a side-link channel, means for receiving, at the UE, side-link transmissions from the connected UE via the side-link channel, means for determining, by the UE, an acknowledgement status of the side-link transmissions, and means for transmitting, by the UE, the acknowledgement status to the connected UE via the side-link channel at a transmission power stepped up according to a power step-up indication within the transmission power configuration.

In an additional aspect of the disclosure, an apparatus configured for wireless communication includes means for receiving, at a UE from a base station in a connected state with the UE, a transmission power configuration for side-link channel transmissions, wherein the UE is connected to an unconnected UE via a side-link channel, means for receiving, by the UE, a schedule for side-link transmissions to the unconnected UE, and means for transmitting, by the UE, the side-link transmissions to the unconnected UE at a transmission power stepped up according to a power step-up indication within the transmission power configuration.

In an additional aspect of the disclosure, an apparatus configured for wireless communication includes means for signaling, by a base station, a side-link power configuration identifying a power step-up indication for transmissions via a side-link channel, means for detecting, by the base station, an acknowledgement status transmitted by an unconnected UE via the side-link channel, wherein the acknowledgement status is in response to side-link transmissions between a connected UE, in a connected state with the base station, and the unconnected UE, in an unconnected state with the base station, and means for enabling, by the base station, a retransmission of the side-link transmissions in response to the acknowledgement status being a NACK.

In an additional aspect of the disclosure, a non-transitory computer-readable medium having program code recorded thereon. The program code further includes code to receive, at a UE, a transmission power configuration for side-link channel transmissions, wherein the UE is connected to a connected UE via a side-link channel, code to receive, at the UE, side-link transmissions from the connected UE via the side-link channel, code to determine, by the UE, an acknowledgement status of the side-link transmissions, and code to transmit, by the UE, the acknowledgement status to the connected UE via the side-link channel at a transmission power stepped up according to a power step-up indication within the transmission power configuration.

In an additional aspect of the disclosure, a non-transitory computer-readable medium having program code recorded thereon. The program code further includes code to receive, at a UE from a base station in a connected state with the UE, a transmission power configuration for side-link channel transmissions, wherein the UE is connected to an unconnected UE via a side-link channel, code to receive, by the UE, a schedule for side-link transmissions to the unconnected UE, and code to transmit, by the UE, the side-link transmissions to the unconnected UE at a transmission power stepped up according to a power step-up indication within the transmission power configuration.

In an additional aspect of the disclosure, a non-transitory computer-readable medium having program code recorded thereon. The program code further includes code to signal, by a base station, a side-link power configuration identifying a power step-up indication for transmissions via a side-link channel, code to detect, by the base station, an acknowledgement status transmitted by an unconnected UE via the side-link channel, wherein the acknowledgement status is in response to side-link transmissions between a connected UE, in a connected state with the base station, and the unconnected UE, in an unconnected state with the base station, and code to enable, by the base station, a retransmission of the side-link transmissions in response to the acknowledgement status being a NACK.

In an additional aspect of the disclosure, an apparatus configured for wireless communication is disclosed. The apparatus includes at least one processor, and a memory coupled to the processor. The processor is configured to receive, at a UE, a transmission power configuration for side-link channel transmissions, wherein the UE is connected to a connected UE via a side-link channel, to receive, at the UE, side-link transmissions from the connected UE via the side-link channel, to determine, by the UE, an acknowledgement status of the side-link transmissions, and to transmit, by the UE, the acknowledgement status to the connected UE via the side-link channel at a transmission power stepped up according to a power step-up indication within the transmission power configuration.

In an additional aspect of the disclosure, an apparatus configured for wireless communication is disclosed. The apparatus includes at least one processor, and a memory coupled to the processor. The processor is configured to receive, at a UE from a base station in a connected state with the UE, a transmission power configuration for side-link channel transmissions, wherein the UE is connected to an unconnected UE via a side-link channel, to receive, by the UE, a schedule for side-link transmissions to the unconnected UE, and to transmit, by the UE, the side-link transmissions to the unconnected UE at a transmission power stepped up according to a power step-up indication within the transmission power configuration.

In an additional aspect of the disclosure, an apparatus configured for wireless communication is disclosed. The apparatus includes at least one processor, and a memory coupled to the processor. The processor is configured to signal, by a base station, a side-link power configuration identifying a power step-up indication for transmissions via a side-link channel, to detect, by the base station, an acknowledgement status transmitted by an unconnected UE via the side-link channel, wherein the acknowledgement status is in response to side-link transmissions between a connected UE, in a connected state with the base station, and the unconnected UE, in an unconnected state with the base station, and to enable, by the base station, a retransmission of the side-link transmissions in response to the acknowledgement status being a NACK.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a block diagram illustrating example blocks executed to implement one aspect of the present disclosure.

FIG. 7 is a block diagram illustrating example blocks executed to implement one aspect of the present disclosure.

DETAILED DESCRIPTION

Figure 1:
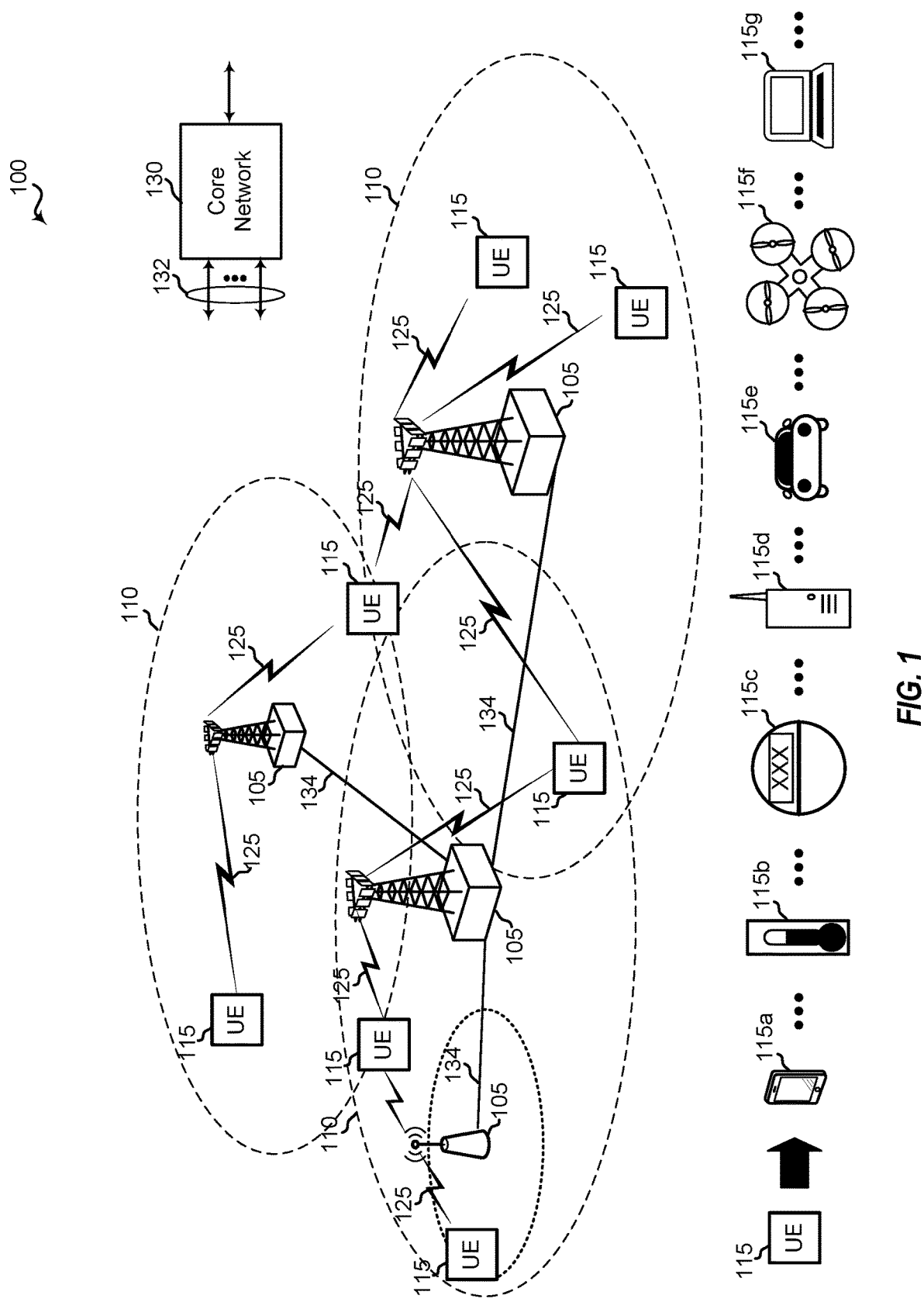
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports a power control framework according to the various aspects of the present disclosure for network-controlled side-band or device-to-device (D2D) communications, in which transmission power for side-link transmissions and acknowledgement information transmission may be stepped up enough for a base station in a connected mode with at least one of the UE devices to detect the side-link transmissions and be configured to take action early on in the communications in order to enhance the reliability of the communications. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices. The wireless communication system 100 may further support industrial Internet-of-things (IIoT) applications, in which base stations 105 manage communications with UEs 115 that may be various IIoT devices, such as meters (e.g., UEs 115b and 115c) and programmable logic controllers (PLCs) (e.g., UE 115d).

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a programmable logic controller (PLC) (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
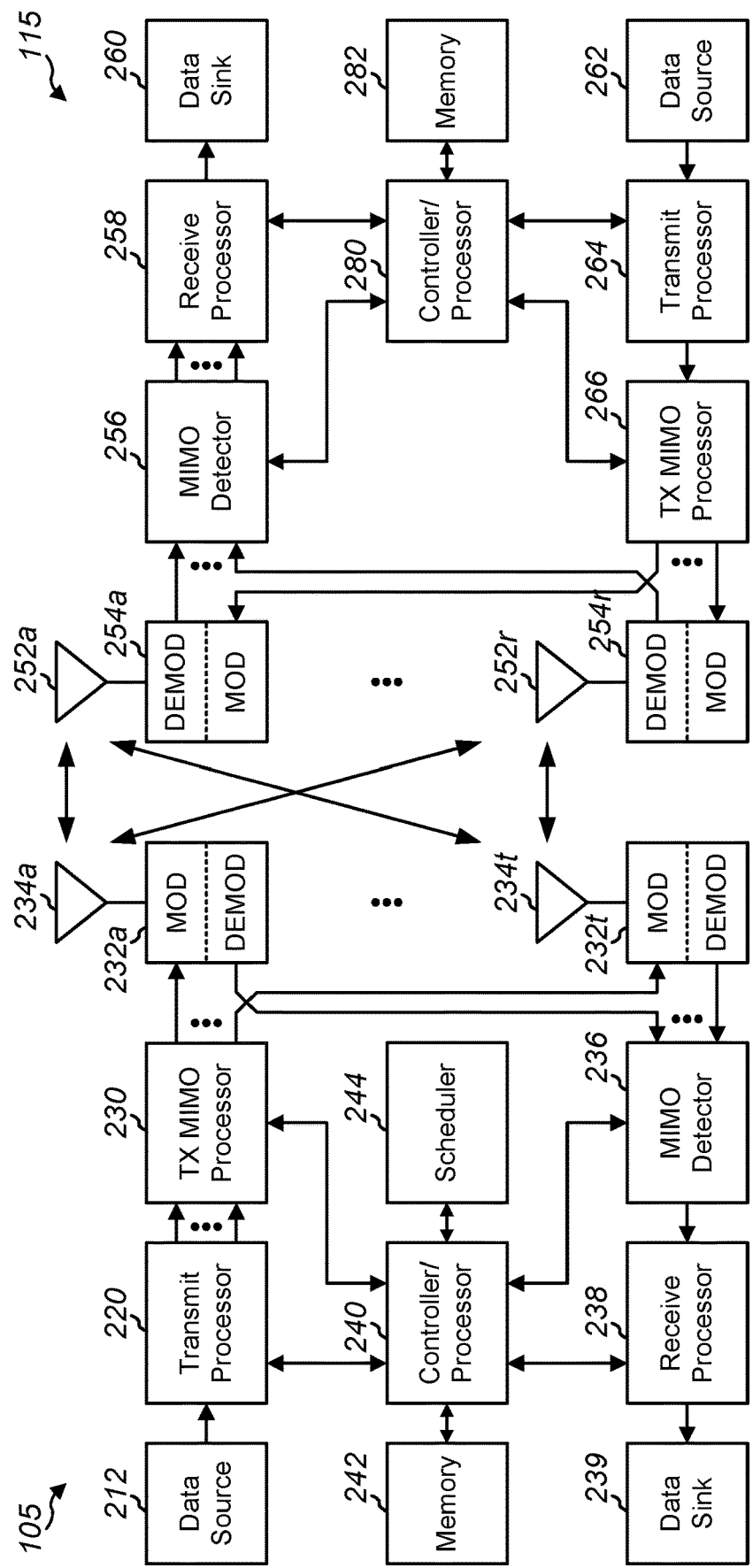
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4, 6, and 7, and/or other processes for the techniques described herein. The memories 242 and 282 may store data and program codes for the base station 105 and the UE 115, respectively. A scheduler 244 may schedule UEs for data transmission on the downlink and/or uplink.

The concept and technology for side-link or device-to-device (D2D) communications was first provided for in 3GPP/LTE standards for public safety. The technology was then revised and enhanced for cellular vehicle-to-everything (C-V2X) operations. Side-link communications offer a workable solution in deployments where there are either no base stations or where base stations may be difficult to deploy or are non-functioning due to unexpected reasons. When there is a considerable volume of traffic among UEs that does not involve infrastructure operations, side-link communications may offer a significant savings of radio resources for certain traffic profiles that avoid unnecessary hops between nodes. Moreover, with fewer hops to base stations and the use of minimum transmission power, a tighter spatial re-use may be realized with a carefully controlled interference footprint. In such implementations, the same radio resources can be reused by two or more pair of links within same cell when proper interference management is employed. Higher reliability may further be achieved through multiple-route diversity, in which a message can be relayed by multiple nodes to the same destination over different routes.

3GPP standards provide for both network-controlled and distributed designs. Distributed designs may be preferred for use cases with frequent out of (gNB) coverage scenarios (e.g., C-V2X). Network-controlled designs may be preferred for use cases with adequate base station coverage and for deployments that demand higher quality of service (QoS) or more demanding performance requirements. Various aspects of the present disclosure are directed to a side-link power control frame work applicable in network-controlled side-link designs.

Figure 3:
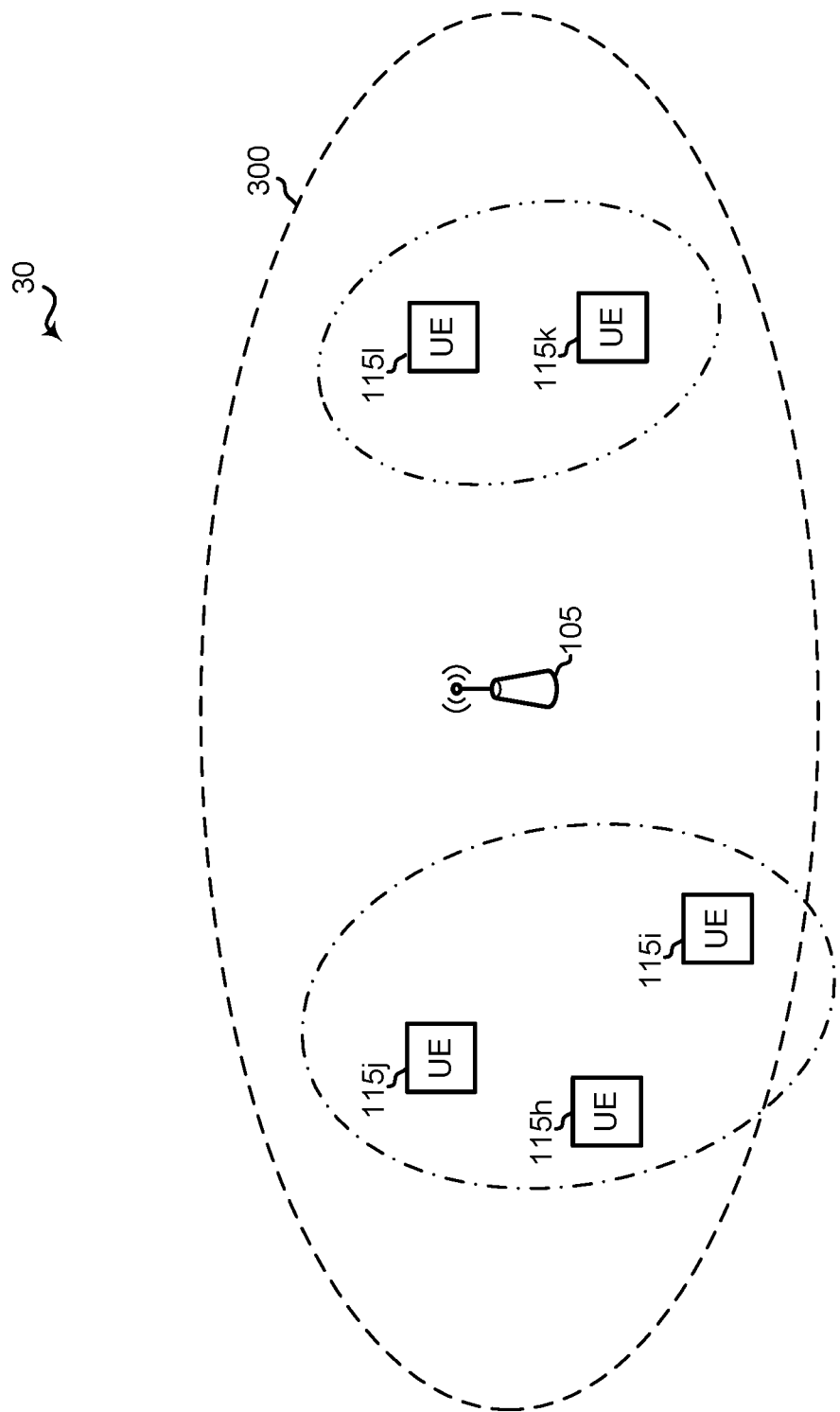
FIG. 3 is a block diagram illustrating a portion of a wireless network.

FIG. 3 is a block diagram illustrating a portion of a wireless network 30. The illustrated portion includes a base station 105 providing coverage area 300 that includes service to UEs 115h-1. For purposes of a first example network, wireless network 30 may be an industrial Internet-of-things (IIoT) network providing wireless service in an industrial environment. In such an example network, UEs 115h and 115k may operate as PLCs within the industrial environment of wireless network 30. PLCs, such as UEs 115h and 115k, may regularly communicate with and control IIoT devices, such as sensors, actuators, and the like (e.g., UEs 115i, 115j, and 115l), placed in specific locations and designed to perform specific tasks related to the industrial process. Because of the nature of this communication, the data exchanged may suggest higher-reliability and lower latency, such as in ultra-reliable, low-latency communication (URLLC) scenarios. Base station 105 may include a larger number of transmit/receive antennas to provide better coverage over the industrial environment. As illustrated, the communication of any high-priority (e.g., URLLC) data between UEs 115h and 115l and nearby UEs 115i, 115j, and 115l may be carried over side-link channels under full control of base station 105. Implementing network-controlled side-link communications within wireless network 30 provides for a more-reliable communication performance. Base station 105, through its connection to the core network, may have better knowledge of the operating environment, and will be responsible for dynamically scheduling individual side-link transmissions between UEs 115*h* and 115*i*-115*j* and between UEs 115*k* and 115*l*.

Wireless network 30, as illustrated in FIG. 3, may further represent another example network. Wireless network 30 may provide wireless services for a C-V2X network. In such a C-V2X network, base station 105 provides coverage area 300 to UEs 115*h*-115*l*. UEs 115*h*-115*l* may be vehicles, such as UE 115*e*. To implement the C-V2X network of wireless network 30, 3GPP discussions of side-link operations provide for side-link transmissions between UEs 115*h*-115*l* (e.g., physical side-link control channel (PSCCH) physical side-link shared channel (PSSCH), from UEs 115*h* and 115*k* in a connected state with base station 105 to UEs 115*i*, 115*j*, and 115*l*, respectively, and physical side-link feedback channel (PSFCH), from UEs 115*i*, 115*j*, and 115*l*, in an idle or unconnected state, and UEs 115*h* and 115*k*, respectively) to be transmitted at the minimum power between the value calculated using path-loss over a direct link (e.g., PUCCH/PUSCH) and that over side-link. Providing the minimum transmission power for side-link transmission may reduce the interference footprint within wireless network 30, which may result in a tighter spatial frequency reuse.

In operation, base station 105 configures UE 115*h* to send side-link transmissions via PSSCH to UE 115*i*. If UE 115*i* fails to successfully decode the transmission, UE 115*i* send a negative acknowledgement (NACK) to UE 115*h* over PSFCH. UE 115*h* may then relay the NACK to base station 105 via PUCCH or PUSCH for scheduling retransmission. Base station 105 may schedule such retransmission by UE 115*h* again via either PSCCH or PSSCH. This process, defined for C-V2X operations, works for C-V2X operations as C-V2X can be dominated by broadcast/multicast transmissions, which do not critically demand very prompt feedback from the unconnected UEs, such as UEs 115*i*, 115*j*, and 115*l*. C-V2X, even with a network-controlled implementation, does not offer true URLLC-level communications. The above choice makes a lot of sense for V2X. V2X is not true URLLC, and can be dominated by broadcast/multi-cast. No critical need for very prompt feedback or for multi-path diversity. Moreover, by allowing the receiving side-link UEs, UEs 115*i*, 115*j*, and 115*l* to be in an unconnected mode, such a C-V2X operation can support a wide range of deployments. However, where more critical QoS is desired, such as in true URLLC, the current transmission power framework for side-link transmissions, such as in C-V2X operations, may not provide a workable solution. Various aspects of the present disclosure are directed to a side-link transmission power framework for network-controlled side-band or communications, in which the transmission power for side-link communications may be stepped up enough for the base station in a connected mode with at least one of the UE devices to detect the side-link transmissions and be configured to take action early on in the communications in order to enhance the reliability of the communications.

Figure 4:
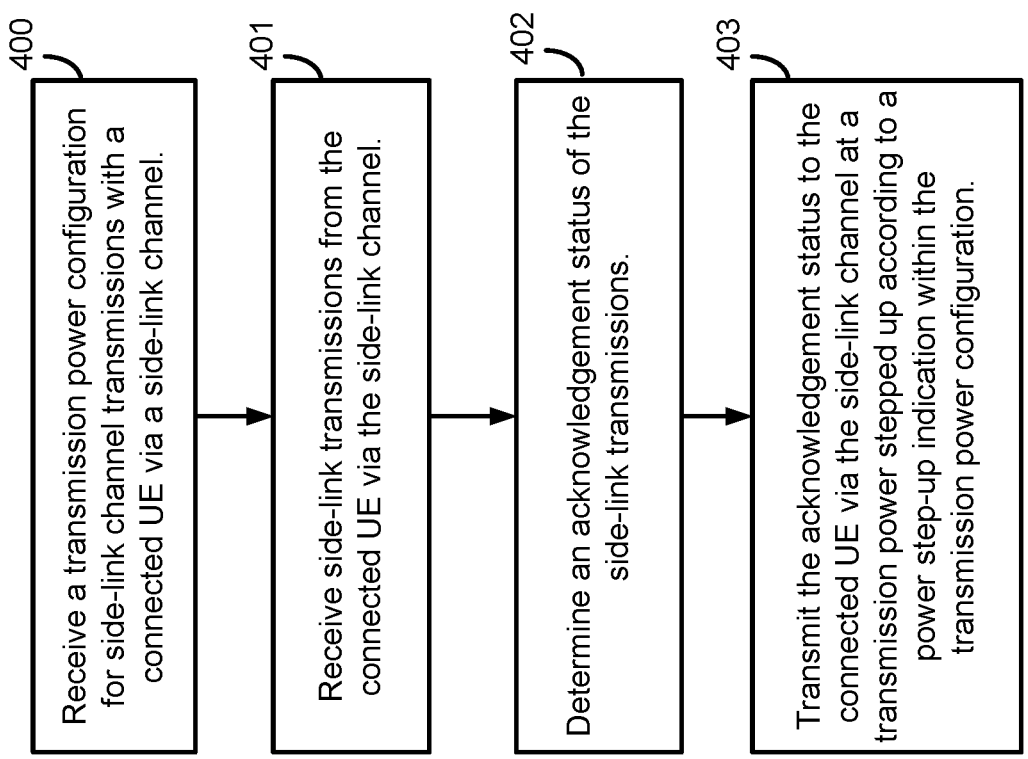
FIG. 4 is a block diagram illustrating example blocks executed to implement one aspect of the present disclosure.
Figure 8:
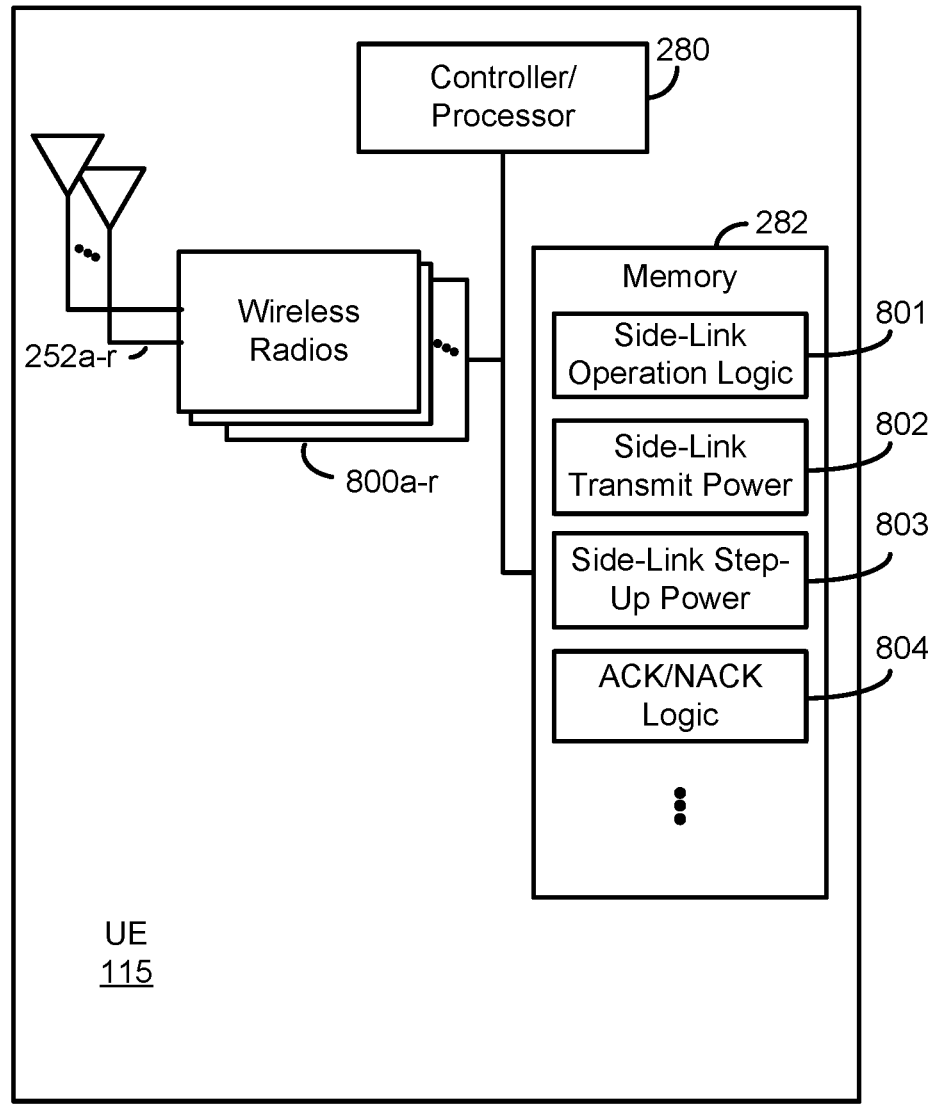
FIG. 8 is a block diagram illustrating a UE configured according to one aspect of the present disclosure.

FIG. 4 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800*a-r* and antennas 252*a-r*. Wireless radios 800*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 400, a UE receives a transmission power configuration for side-link channel transmissions, wherein the UE is connected to a connected UE via a side-link channel. A UE, such as UE 115, capable of side-link communications includes side-link operations logic 801, stored in memory 282. Under control of controller/processor 280, UE 115 may execute side-link operations logic 801 to provide the features and functionality for D2D/side-link communications. UE 115 is in an unconnected state with any base station, but maintains side-link communications with a connected UE, within the execution environment of side-link operations logic 801. In typical operations, UE 115 will receive an enhanced transmission power configuration either from the connected UE or directly from a base station controlling the side-link operations. The transmit power configuration is received at UE 115 via antennas 252*a-r* and wireless radios 800*a-r*. UE 115 extracts the transmission power control parameters, storing the step-up power indicator in memory 282 at slide-link step-up power 803, and storing the standard side-link transmission power or power selection algorithm in memory 282 at side-link transmit power 802.

At block 401, the UE receives side-link transmissions from the connected UE via the side-link channel. Within the execution environment of side-link operations logic 801, UE 115 may receive side link traffic over a side-link channel via antennas 252*a-r* and wireless radios 800*a-r*.

At block 402, the UE determines an acknowledgement status of the side-link transmissions. Within wireless radios 800*a-r*, UE 115 processes the received signals and may determine whether the decoding attempt is successful or unsuccessful. Under control of controller/processor 280, UE 115 executes acknowledgement logic 804, stored in memory 282. The execution environment of acknowledgement logic 804 provides the functionality for UE 115 to determine whether such decoding attempt is successful or not. If successful, UE 115 will identify an ACK status, while if unsuccessful, UE 115 will identify a NACK status.

At block 403, the UE transmits the acknowledgement status to the connected UE via the side-link channel at a transmission power stepped up according to a power step-up indication within the transmission power configuration. Within the execution environments of both acknowledgement logic 804 and side-link operations logic 801, UE 115 generates the acknowledgement signal and uses side-link step-up power 803 to set the transmit power of wireless radios 800*a-r*. Using the stepped-up side-link transmission power, UE 115 transmits the acknowledgement signal via wireless radios 800*a-r* and antennas 252*a-r*. The step-up power indicator stored in side-link step-up power 803, as noted in greater detail below, may include a transmit power selection algorithm, which selects the maximum transmit power between the direct channel transmit power and the side-link channel transmit power. The step-up power indicator may also include a power offset value that UE 115 uses to add to the standard side-link power stored in memory 282 at side-link transmit power 802.

Figure 5:
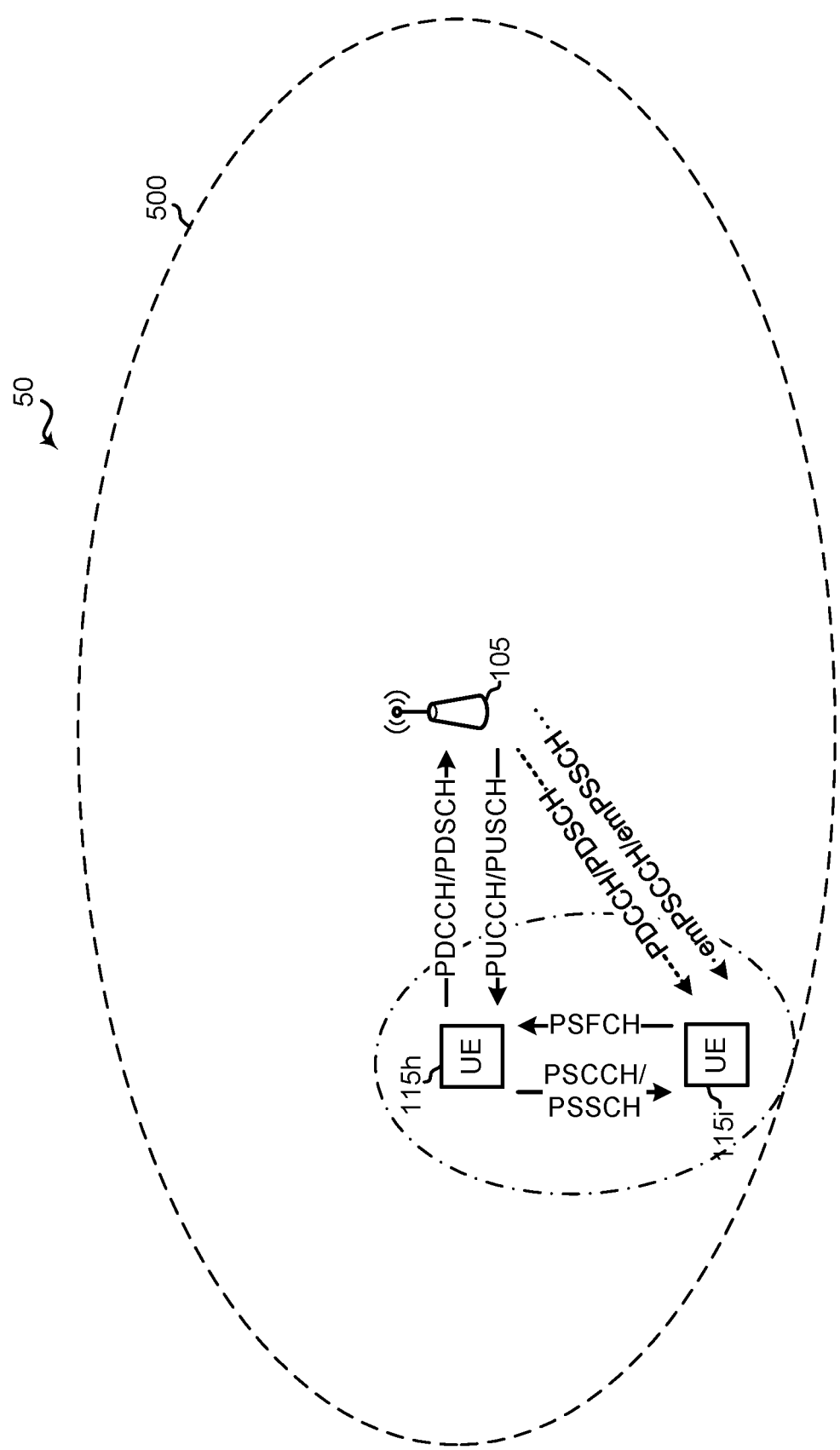
FIG. 5 is a block diagram illustrating a portion of a wireless network including a base station, a UE, in a connected state with the base station, and a UE, in an idle state with respect to the base station, each of which configured according to aspects of the present disclosure.

FIG. 5 is a block diagram illustrating a portion of a wireless network 30 including base station 105, UE 115*h*, in a connected state with base station 105, and UE 115*i*, in an idle state with respect to base station 105, each of which nodes is configured according to aspects of the present disclosure. Unlike current side-band operations, such as C-V2X, where a minimum transmit power is selected for side-band transmissions to minimize interference and increase frequency reuse, side-band operations according to the described example aspect may be transmitted at a high enough power for base station 105 to detect and act on to increase reliability. Accordingly, in a first example aspect, as UE 115*i*, the unconnected UE, receives side-link traffic via the side-link traffic channels (PSCCH/PSSCH) from UE 115*h*, the connected UE, it determines an acknowledgement status (e.g., acknowledgement (ACK) or negative acknowledgement (NACK)) of the transmissions and signals its ACK/NACK over the side-link feedback channel (PSFCH) to UE 115*h*.

In preparation for transmitting the feedback, UE 115*i* uses an enhanced transmission power configuration, according to the described aspect, that includes a step-up power indication. The step-up power indication instructs UE 115*i* to use a higher transmit power to transmit ACK/NACK to UE 115*h*. The feedback transmission at this higher transmit power allows base station 105 to detect and receive the feedback directly from UE 115*i*. In legacy side-link operations, multiple hops would be made to relay the feedback from UE 115*i* to base station 105, where base station 105 would formulate a reaction and schedule that reaction with UE 115*h*, to then take the action with UE 115*i*. In operation of the described example aspect, base station 105 now directly obtains the feedback from UE 115*i* and can take action immediately, by sending scheduling instructions, such as for re-transmission, to UE 115*h*, or by directly retransmitting the traffic to UE 115*i*.

The step-up power indication in the enhanced transmission power configuration may be implemented in various ways. For example, a new transmit power algorithm may be defined that selects the maximum transmit power between the transmit power that would be calculated based on the side-link channel (e.g., PSFCH) and the transmit power that would be calculated based on direct channel (e.g., PUCCH/PUSCH). Alternatively, the enhanced transmission power configuration may include a step-up power offset that is added to the legacy side-link transmit power to result in a sufficient level for base station 105 to detect and decode the feedback transmission. Base station 105 directly receiving the feedback transmission can assist in avoiding delay due to a multi-hop transmission of NACK, while at the same time to reducing interference footprint.

The enhanced transmission power configuration may be obtained by UE 115*i* either directly from base station 105 or indirectly through UE 115*h*. In either case, base station 105 may include the configuration in RRC signaling, as a medium access control (MAC) control element (MAC-CE), a downlink control information (DCI) message, a side-link control information (SCI) message, or the like, to UE 115*h* or UE 115*i*. Within the enhanced transmission power configuration, base station 105 may indicate a different reference signal for power control or may also indicate different fractional power control parameters, such as PO and alpha, for side-link feedback transmission power control.

In an additional example aspect, UE 115*i* may be configured to select the higher transmit power via the step-up power indication for certain transmissions (e.g., NACK). In such example aspects, when UE 115*i* determines that it successfully decoded the side-link traffic from UE 115*h*, it will transmit an ACK via PSFCH at the lower side-link transmit power. However, where UE 115*i* determines that it did not successfully decode the side-link traffic, it will transmit the NACK via PSFCH at the higher transmit power using the step-up power indication. Base station 105 may then directly detect and decode the NACK in order to begin the retransmission process without waiting for the NACK to be relayed from UE 115*h*.

Figure 9:
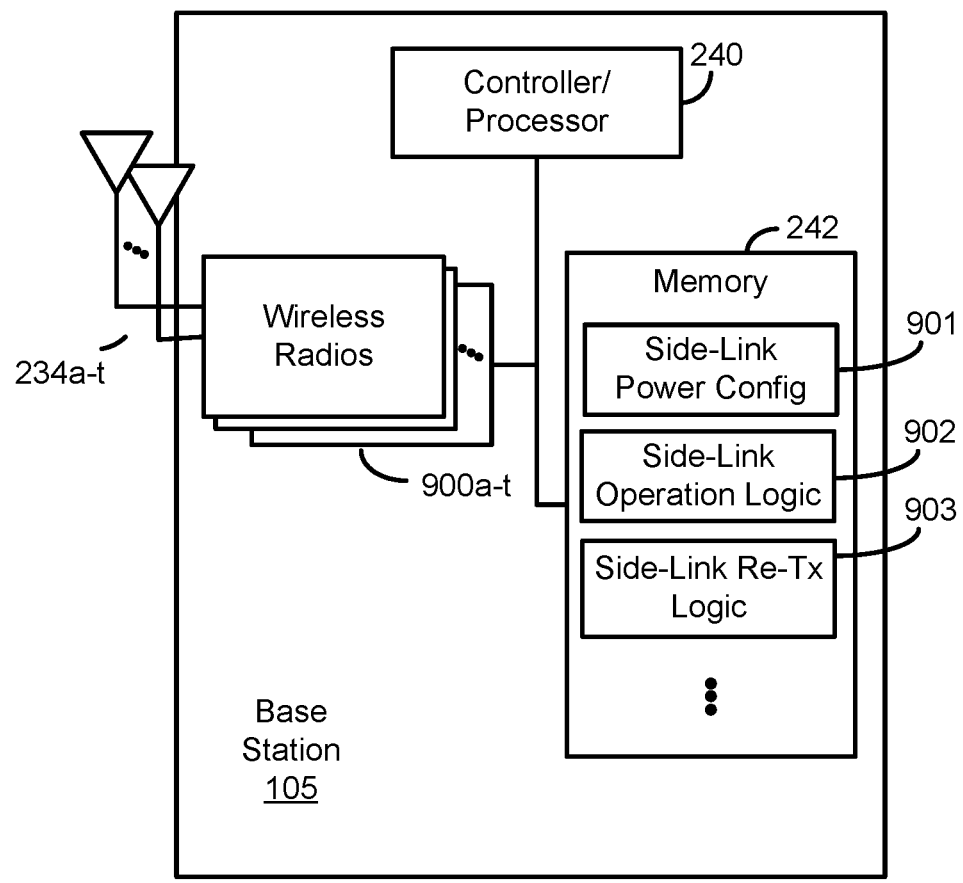
FIG. 9 is a block diagram illustrating a base station configured according to one aspect of the present disclosure.

FIG. 6 is a block diagram illustrating example blocks executed to implement one aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900*a-t* and antennas 234*a-t*. Wireless radios 900*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 600, a base station signals a side-link power configuration identifying a power step-up indication for transmissions via a side-link channel. A base station, such as base station 105, which controls side-link communications between various connected and unconnected UEs at least partially within its coverage area includes side-link operations logic 902, stored in memory 242. Under control of controller/processor 240, base station 105 may execute side-link operations logic 902 to provide the features and functionality for D2D/side-link communications. Base station 105, further under control of controller/processor 240, executes side-link power configurator 901, stored in memory 242. The execution environment of side-link power configurator 901 provides base station 105 with the features and functionality for base station 105 to determine a transmission power configuration for UEs participating in side-link communications. Base station 105 may determine whether to configure stepped-up transmit power for unconnected UEs to transmit feedback only or to configured the stepped-up transmit power for side-link traffic as well as for side-link feedback transmissions. The execution environment of side-link power configurator 901 may further allow base station 105 to determine when to apply the step-up power configuration for scenarios in which the side-link traffic channel is experiencing lower reliability, or when side-link transmissions are allocated to a secondary uplink (SUL) spectrum, as noted in greater detail below. Base station 105 transmits the transmission power configuration to either or both of the connected and unconnected UEs using RRC, MAC-CE, DCI, SCI, or the like, via wireless radios 900*a-t* and antennas 234*a-t*.

At block 601, the base station detects an acknowledgement status transmitted by an unconnected UE via the side-link channel, wherein the acknowledgement status is in response to side-link transmissions between a connected UE, in a connected state with the base station, and the unconnected UE, in an unconnected state with the base station. Within the execution environment of side-link operations logic 902, base station 105 monitors, at least, for any side-link feedback signals (e.g., ACK/NACK), and according to additional aspects, for any side-link traffic signals, via antennas 234*a-t* and wireless radios 900*a-t*.

At block 602, the base station enables a retransmission of the side-link transmissions in response to the acknowledgement status being a NACK. Upon detection of a NACK signal transmitted via the side-link feedback channel, base station 105, under control of controller/processor 240, executes side-link retransmission logic 903. The execution environment of side-link retransmission logic 903 provides base station 105 with the features and functionality for triggering retransmission of the side-link traffic in response to detecting the side-link NACK. Within the execution environment, base station 105 may either directly conduct the retransmission via wireless radios 900a-t and antennas 234a-t, such as through direct channel (PDCCH/PSCCH) transmissions or by emulating side-link transmissions in an emulated version of PSCCH/PSSCH, or indirectly conduct retransmission by signaling the connected UE to perform the retransmission. Alternatively, the execution environment of side-link retransmission logic 903 may prompt base station 105 to schedule simultaneous retransmissions both by base station 105 and the connected UE.

Referring back to FIG. 5, base station 105 configures the side-link power control for UEs 115h and 115i. It generates the enhanced transmission power configuration based on the channel conditions and any statistics that it may compile or receive from various channel state reports or NACK statistics. As noted above, base station 105 may then signal the enhanced transmission power configuration to either or both of UEs 115h and 115i via RRC signaling, MAC-CE, DCI, SCI, etc., using direct downlink channels, such as PDCCH/PDSCH. When configured to adjust the side-link feedback transmissions, the enhanced power configuration may include the step-up power indication that UE 115i may use when preparing for any feedback transmissions to UE 115h. Base station 105 may then detect transmission of such feedback signals and act in accordance with the feedback. As described above, in a NACK feedback scenario, base station 105 directly receives the NACK from UE 115i's PSFCH transmission to UE 115h, and enables retransmission of the side-link traffic, either directly from base station 105 to UE 115i or through scheduling UE 115h for the retransmission. Base station 105 may also configure the side-link power to adjust the side-link traffic from UE 115h to UE 115i. Stepping up the transmit power for side-link transmissions between UE 115h and UE 115i allows base station 105 to, again, directly detect and decode the side-link traffic, which allows base station 105 to more easily perform any direct retransmissions in response to a detected NACK from UE 115i.

FIG. 7 is a block diagram illustrating example blocks executed to implement one aspect of the present disclosure. The example blocks will also be described with respect to UE 115 as illustrated in FIG. 8.

At block 700, a UE receives from a base station in a connected state with the UE, a transmission power configuration for side-link channel transmissions, wherein the UE is connected to an unconnected UE via a side-link channel. A UE, such as UE 115, capable of side-link communications includes side-link operations logic 801, stored in memory 282. Under control of controller/processor 280, UE 115 may execute side-link operations logic 801 to provide the features and functionality for D2D/side-link communications. UE 115 is in a connected state with a base station, and maintains side-link communications with an unconnected UE, within the execution environment of side-link operations logic 801. In typical operations, UE 115 will receive an enhanced transmission power configuration directly from a base station controlling the side-link operations. The transmit power configuration is received at UE 115 via antennas 252a-r and wireless radios 800a-r. UE 115 extracts the transmission power control parameters, storing the step-up power indicator in memory 282 at slide-link step-up power 803, and storing the standard side-link transmission power or power selection algorithm in memory 282 at side-link transmit power 802.

At block 701, the UE receives a schedule for side-link transmissions to the unconnected UE. As a network-controlled side-link operation, all side-link communications are controlled or scheduled by the network via base stations. Accordingly, UE 115 may occasionally receive side-link transmission scheduling messages from the base station via antennas 252a-r and wireless radios 800a-r.

At block 702, the UE transmits the side-link transmissions to the unconnected UE at a transmission power stepped up according to a power step-up indication within the transmission power configuration. Upon receiving the side-link transmission schedule, within the execution environment of side-link operations logic 801, UE 115 will transmit the side-link traffic to an unconnected UE via wireless radios 800a-r and antennas 252a-r. However, as configured according to various aspects of the present disclosure, UE 115 uses the step-up power indicator stored at side-link step-up power 803 to transmit the side-link traffic at a higher transmit power than the standard side-link transmit power, stored at side-link transmit power 802.

Referring back to FIG. 5, base station 105 defines the step-up power indication that includes a step-up for transmission power by UE 115h for side-link traffic transmissions via PSCCH/PSSCH to UE 115i. As noted above, the step-up power indication may include a newly-defined algorithm that selects the maximum power between the direct link power and the side-link power or may include a step-up power offset, which UE 115h may apply to the standard side-link transmit power. This step-up power indication is communicated from base station 105 in the enhanced transmission power configuration signaled via RRC, MAC-CE, DCI, SCI, and the like.

It should be noted that, in some side-link operation implementations, certain transmissions are not available for retransmission. For example, in IIoT deployments, where a given side-link transmission is already a retransmission of a previous side-link transmission, there is no further delay budget for subsequent retransmissions. Thus, base station 105 and/or UE 115h may be configured to use the step-up power indication only on transmissions that allow retransmission, and, when a particular transmission does not allow retransmissions, UE 115h would apply the standard side-link transmit power.

It should further be noted that, in an additional aspect, base station 105 may determine whether to configure the side-link transmission power control to include a step-up indication for the side-link traffic from UE 115h to UE 115i based on the current conditions of the side-link channel. In such aspects, base station 105 may review channel quality indicator (CQI) reports or NACK statistics to determine the reliability of the side-link channel. If the overall reliability appears to be above a threshold, then no step-up of transmission power may be applied. However, if the overall channel reliability falls below a predetermined threshold, base station 105 may configure the side-link transmission power control for UE 115h to also step-up the transmission power for side-link traffic to UE 115i.

The increased side-link transmission power for side-link traffic and side-link feedback allows base station 105 to directly detect and decode the side-link communications between UE 115*h* and 115*i*. Thus, when base station 105 detects a NACK from UE 115*i*, it may trigger retransmission of the side-link traffic. Base station 105 may have detected and decoded the side-link traffic upon original transmission by UE 115*h*. The detection may occur with the increased power applied by UE 115*h* with the step-up power indication. Alternatively, base station 105 detect such side-link transmissions opportunistically due to the larger number of receive antennas even when UE 115*h* transmits the side-link traffic at the standard side-link transmit power. Because base station 105 has the decoded side-link traffic, when NACK is detected, base station 105 may directly provide the retransmission via direct downlink channels to UE 115*i* (e.g., PDCCH/PDSCH).

In additional aspects, base station 105 may arrange simultaneous retransmission with UE 115*h* over the side-link traffic channels (PSCCH/PSSCH). In such case, a multiple-transmission-reception point (TRP) retransmission may be provided over heterogeneous links (e.g., direct PDCCH/PDSCH links and side-links PSCCH/PSSCH), which increases the likelihood that UE 115*i* will successfully receive the retransmitted information. In such multiple-TRP retransmission scenarios, UE 115*i* may signal the acknowledgement status for both retransmissions using the side-link feedback channel (PSFCH). In such case, either UE 115*h* may relay the acknowledgement status to base station 105 via direct link PUCCH/PUSCH or, when UE 115*i* transmits the feedback at using the step-up power indication, base station 105 may directly detect the acknowledgement status transmitted by UE 115*i*. This feedback mechanism via side-link channels is particularly useful when there is no direct connection or no uplink synchronization between UE 115*i* and base station 105 (e.g., no PUCCH/PUSCH).

It should be noted that in an additional aspect, when base station 105 detects and decodes the acknowledgement status from UE 115*i*, base station 105 may retransmit the side-link traffic using an emulated side-link channel from base station 105 (e.g., emPSCCH/emPSSCH). To implement such emulated side-link transmission, base station 105 may reconfigure the corresponding transmission configuration indicators (TCIs) so that the side-link receivers within UE 115*i* can use the correct receiver filters or configurations to receive the retransmitted traffic.

In network configurations that include the availability of both primary uplink (PUL) and secondary uplink (SUL) spectrum, the stepped-up transmission power feature of the various aspects of the present disclosure may be more favorably applied when side-link communications are allocated to the SUL. When considering that the SUL spectrum may comprise lower frequency bandwidth with a smaller pathloss, the modified transmission power may result in higher transmission reliability. In aspects where PUL and SUL spectrum are available, base station 105 may determine to apply the step-up power indication when side-link communications (e.g., side-link traffic via PSCCH/PSSCH and/or side-link feedback via PSFCH) are allocated to the SUL. Thus, where better coverage of PSFCH (not only to side-link transmitter, UE 115*h*, but also to base station 105) can be achieved through allocating it over SUL, and/or better coverage of PSCCH/PSSCH to facilitate diversity-based retransmissions (not only to the side-link receiver, UE 115*i*, but also to base station 105) can be achieved through allocating them over SUL, base station 105 may configure the enhanced transmission power configuration to include the step-up power indicator to cause the side-link communications to be transmitted at the higher transmit power, as described in the various aspects.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4, 6, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE), a transmission power configuration for side-link channel transmissions, wherein the transmission power configuration includes a power step-up indication determined in accordance with current transmission conditions wherein the UE is connected to a connected UE via a side-link channel, wherein the connected UE is associated with a connected state with respect to a base station, and wherein the UE is associated with an unconnected or idle state with respect to the base station;
   receiving, at the UE, side-link transmissions from the connected UE via the side-link channel; and
   transmitting, by the UE, an acknowledgement status of the side-link transmissions to the connected UE via the side-link channel at a first transmission power stepped up according to the power step-up indication, wherein the first transmission power is stepped up according to the power step-up indication in accordance with power step-up criteria being satisfied, the power step-up criteria including:
     the acknowledgement status indicating a negative acknowledgement (NACK) of the side-link transmissions; and
     the side-link transmissions being associated with a first transmission type,
   wherein the first transmission type is associated with eligibility for a retransmission procedure, wherein a second transmission type different than the first transmission type is associated with ineligibility for the retransmission procedure, and wherein the second transmission type is associated with a second transmission power that is less than the first transmission power stepped up according to the power step-up indication.

2. The method of claim 1, wherein the transmission power configuration includes one or more of:
   a different reference signal indication for the transmitting the acknowledgement status; or
   different fractional power control parameters for the transmitting the acknowledgement status.

3. The method of claim 1, wherein the transmission power configuration is received from one of: the connected UE or the base station.

4. The method of claim 3, wherein the transmission power configuration received from the base station is received via one of:
   radio resource control (RRC) signaling;
   a medium access control (MAC) control element (MAC-CE);
   a downlink control information (DCI) message; or
   a side-link control information (SCI) message.

5. The method of claim 1, wherein the power step-up indication includes one of:
   a power selection algorithm with instruction for the UE to select the first transmission power as a maximum transmit power between a side-link power based on the side-link channel and a direct-link power based on a direct-link channel; or
   a step-up power offset for the UE to add to the side-link power.

6. The method of claim 1, wherein the determining the acknowledgement status includes:
   determining the acknowledgement status as the NACK in response to the side-link transmissions being unsuccessfully received.

7. The method of claim 1, further including:
   receiving, at the UE, a retransmission of the side-link transmissions, wherein the retransmission is received via one of:
     a direct retransmission from the base station;
     a side-link retransmission from the connected UE; or
     multi-transmission-reception point (TRP) retransmissions including the direct retransmission from the base station and the side-link retransmission from the connected UE.

8. The method of claim 7, wherein the direct retransmission from the base station is received via one of:
   a direct transmission channel from the base station; or
   an emulated side-link channel from the base station.

9. The method of claim 7, further including:
determining, by the UE, a retransmission acknowledgement status for each of the TRP retransmissions; and
transmitting, by the UE, the retransmission acknowledgement status to the connected UE via the side-link channel.

10. The method of claim 9, wherein the retransmission acknowledgement status is transmitted via the side-link channel at the first transmission power stepped up according to the power step-up indication.

11. The method of claim 1, further including selecting the first transmission power for the acknowledgement status from among multiple transmission powers including the first transmission power stepped up according to the power step-up indication and further including the second transmission power.

12. The method of claim 11, further including:
receiving a retransmission of the side-link transmissions in response to transmitting the acknowledgement status;
determining a retransmission acknowledgement status of the retransmission; and
in response to the retransmission acknowledgement status corresponding to an acknowledgement (ACK) of the retransmission, transmitting the retransmission acknowledgement status to the connected UE via the side-link channel based on the second transmission power.

13. The method of claim 12, wherein the UE transmits the acknowledgement status to the connected UE via the side-link channel at the first transmission power stepped up according to the power step-up indication to enable the base station to receive the acknowledgement status while the UE is associated with the unconnected or idle state with respect to the base station, and wherein the UE receives the retransmission of the side-link transmission directly from the base station.

14. The method of claim 1, wherein the UE receives the transmission power configuration from the connected UE via a sidelink control information (SCI) message.

15. A method of wireless communication, comprising:
receiving, at a user equipment (UE) from a base station in a connected state with the UE, a transmission power configuration for side-link channel transmissions, wherein the transmission power configuration includes a power step-up indication determined in accordance with current transmission conditions, wherein the UE is connected to an unconnected UE via a side-link channel, and wherein the unconnected UE is associated with an unconnected or idle state with respect to the base station;
receiving, by the UE, a schedule for side-link transmissions to the unconnected UE;
transmitting, by the UE, the side-link transmissions to the unconnected UE; and
receiving, by the UE, an acknowledgement status associated with the side-link transmissions from the connected UE via the side-link channel at a first transmission power stepped up according to the power step-up indication, wherein the first transmission power is stepped up according to the power step-up indication in accordance with power step-up criteria being satisfied, the power step-up criteria including:
the acknowledgement status indicating a negative acknowledgement (NACK) of the side-link transmissions; and
the side-link transmissions being associated with a first transmission type,
wherein the first transmission type is associated with eligibility for a retransmission procedure, wherein a second transmission type different than the first transmission type is associated with ineligibility for the retransmission procedure, and wherein the second transmission type is associated with a second transmission power that is less than the first transmission power stepped up according to the power step-up indication.

16. The method of claim 15, further including:
determining, by the UE, that the retransmission procedure is available for the side-link transmissions, wherein the transmitting according to the step-up power indication is in response to availability of the retransmission procedure.

17. The method of claim 15, further including:
receiving, at the UE, a retransmission schedule from the base station to configure retransmission of the side-link transmissions via the side-link channel, wherein the retransmission schedule is received in response to a negative acknowledgement (NACK) received on the side-link channel from the unconnected UE.

18. The method of claim 17, further including:
receiving, at the UE, a retransmission acknowledgement status for each transmission of multi-transmission-reception point (TRP) retransmissions, wherein the TRP retransmissions include the retransmission of the side-link transmissions and a direct retransmission from the base station; and
signaling, by the UE, the retransmission acknowledgement status for the each transmission to the base station.

19. The method of claim 15, further including:
signaling, by the UE, the transmission power configuration to the unconnected UE via the side-link channel.

20. A method of wireless communication, comprising:
transmitting, by a base station, a side-link power configuration identifying a power step-up indication for transmissions via a side-link channel, wherein the power step-up indication is determined in accordance with current transmission conditions;
receiving, by the base station, an acknowledgement status transmitted by an unconnected user equipment (UE) via the side-link channel, wherein the acknowledgement status is associated with side-link transmissions between a connected UE, in a connected state with the base station, and the unconnected UE, in an unconnected state with the base station, and wherein a first transmission power of the acknowledgement status is stepped up according to the power step-up indication in accordance with power step-up criteria being satisfied, the power step-up criteria including:
the acknowledgement status indicating a negative acknowledgement (NACK) of the side-link transmissions; and
the side-link transmissions being associated with a first transmission type; and
enabling, by the base station, a retransmission of the side-link transmissions in response to the acknowledgement status being a negative acknowledgement (NACK),
wherein the first transmission type is associated with eligibility for a retransmission procedure, wherein a second transmission type different than the first transmission type is associated with ineligibility for the retransmission procedure, and wherein the second transmission type is associated with a second transmission power that is less than the first transmission power stepped up according to the power step-up indication.

21. The method of claim 20, wherein the side-link power configuration is applicable to one or both of:
   the side-link transmissions from the connected UE to the unconnected UE; and
   side-link feedback transmissions from the unconnected UE to the connected UE.

22. The method of claim 21, further including:
   obtaining, by the base station, a channel condition report associated with the side-link transmissions from the connected UE to the unconnected UE; and
   identifying, by the base station, a side-link power configuration applicability to the side-link transmissions from the connected UE to the unconnected UE in response to the channel condition report indicating a channel quality below a threshold quality level.

23. The method of claim 20, wherein the enabling the retransmission of the side-link transmissions includes identifying the side-link transmissions and one of:
   transmitting, by the base station, the retransmission directly to the unconnected UE; or
   scheduling, by the base station, a multi-transmission-reception point (TRP) retransmission including transmission of the retransmission by the base station directly to the unconnected UE and transmission of the retransmission by the base station to the unconnected UE.

24. The method of claim 23, wherein the transmitting the retransmission directly to the unconnected UE includes transmitting via one of:
   a direct transmission channel from the base station; or
   an emulated side-link channel from the base station.

25. The method of claim 23, wherein the identifying the side-link transmissions includes one of:
   detecting the side-link transmissions transmitted by the connected UE at the first transmission power stepped up according to the power step-up indication; or
   detecting the side-link transmissions transmitted by the connected UE at a particular transmission power configured for the side-link channel.

26. The method of claim 20, further comprising:
   allocating, by the base station, side-link communications for one or both of: the side-link transmissions from the connected UE to the unconnected UE and side-link feedback transmissions from the unconnected UE to the connected UE, to a secondary uplink (SUL) channel, wherein the enabling is performed in response to the allocating.

27. An apparatus configured for wireless communication, the apparatus comprising:
   at least one processor; and
   a memory coupled to the at least one processor,
   wherein the at least one processor is configured to:
      receive, at a user equipment (UE), a transmission power configuration for side-link channel transmissions, wherein the transmission power configuration includes a power step-up indication determined in accordance with current transmission conditions, wherein the UE is connected to a connected UE via a side-link channel, wherein the connected UE is associated with a connected state with respect to a base station, and wherein the UE is associated with an unconnected or idle state with respect to the base station;
      receive, at the UE, side-link transmissions from the connected UE via the side-link channel; and
      transmit, by the UE, an acknowledgement status of the side-link transmissions to the connected UE via the side-link channel at a first transmission power stepped up according to a the power step-up indication, wherein the first transmission power is stepped up according to the power step-up indication in accordance with power step-up criteria being satisfied, the power step-up criteria including:
         the acknowledgement status indicating a negative acknowledgement (NACK) of the side-link transmissions; and
         the side-link transmissions being associated with a first transmission type,
      wherein the first transmission type is associated with eligibility for a retransmission procedure, wherein a second transmission type different than the first transmission type is associated with ineligibility for the retransmission procedure, and wherein the second transmission type is associated with a second transmission power that is less than the first transmission power stepped up according to the power step-up indication.

28. The apparatus of claim 27, further including configuration of the at least one processor:
   to receive, at the UE, retransmission of the side-link transmissions, wherein the retransmission is received via one of:
      a direct retransmission from the base station;
      a side-link retransmission from the connected UE; or
      multi-transmission-reception point (TRP) retransmissions including the direct retransmission from the base station and the side-link retransmission from the connected UE.

* * * * *